(12) United States Patent
Shibata et al.

(10) Patent No.: US 7,046,392 B2
(45) Date of Patent: May 16, 2006

(54) COMMUNICATION SYSTEM AND METHOD, AND STORAGE MEDIUM FOR THE SYSTEM

(75) Inventors: Tetsuya Shibata, Yawata (JP); Shigeki Nakahara, Nara (JP); Tamotsu Shuto, Kashihara (JP); Makoto Nakabayashi, Nara (JP); Tsutomu Taniguchi, Nara (JP); Katsumi Nagata, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 807 days.

(21) Appl. No.: 09/833,989

(22) Filed: Apr. 12, 2001

(65) Prior Publication Data

US 2001/0030762 A1    Oct. 18, 2001

(30) Foreign Application Priority Data

Apr. 12, 2000   (JP)   .............................. 2000-110856

(51) Int. Cl.
*G06F 15/00* (2006.01)
(52) U.S. Cl. .................... 358/1.9; 358/1.15; 358/1.16; 358/400; 358/404; 358/444; 345/543; 379/102.02
(58) Field of Classification Search ................ 358/1.9, 358/13.14–1.17, 400, 402, 404, 406, 444, 358/468, 437, 407, 440; 345/543, 53; 399/83; 379/102.02, 88.28, 93.01; 455/11.1
See application file for complete search history.

(56) References Cited

U.S. PATENT DOCUMENTS

| 4,573,083 | A | * | 2/1986 | Shimizu ...................... 358/407 |
| 5,055,945 | A | * | 10/1991 | Oguma et al. ............... 358/468 |
| 5,134,502 | A | * | 7/1992 | Nakatsuma ................. 358/440 |
| 5,208,681 | A | * | 5/1993 | Yoshida ...................... 358/404 |
| 5,216,520 | A | * | 6/1993 | Omura et al. ............... 358/437 |
| 5,392,132 | A | * | 2/1995 | Yamamoto et al. ......... 358/407 |
| 5,473,674 | A | * | 12/1995 | Maeda ..................... 379/93.01 |
| 5,825,992 | A | * | 10/1998 | Satoh ......................... 358/1.16 |
| 5,930,003 | A | * | 7/1999 | Kondo ........................ 358/404 |
| 5,991,053 | A | * | 11/1999 | Matsuo et al. .............. 358/468 |
| 6,124,942 | A | * | 9/2000 | Ichinowatari .............. 358/1.17 |
| 6,381,038 | B1 | * | 4/2002 | Endo .......................... 358/400 |
| 6,449,056 | B1 | * | 9/2002 | Mishima et al. ........... 358/1.16 |

(Continued)

FOREIGN PATENT DOCUMENTS

JP         02216972 A       8/1990

(Continued)

*Primary Examiner*—Kimberly Williams
*Assistant Examiner*—Beniyam Menberu
(74) *Attorney, Agent, or Firm*—David G. Conlin; Steven M. Jensen; Edwards Angell Palmer & Dodge, LLP

(57) ABSTRACT

A communication system serving as a transmitter terminal and a receiver terminal for communications with a second communication system via a communication line, the communication system includes a storage section for data storage; a communication section for data communications, the communication section being adapted for reception and transmission of data and size information indicative of the size of the data with respect to the second communication system; a detection section for detecting a free space in the storage section; a comparing section for comparing the data size contained in the size information with the size of the free space in the storage section; a calculating section for, if the storage section is short of free space for accommodation of the data size, calculating a waiting period required for recovery from the shortage of the free space in the storage section; and a timer section for timing the lapse of the waiting period.

13 Claims, 8 Drawing Sheets

U.S. PATENT DOCUMENTS 6,574,452 B1 * 6/2003 Morvan et al. ............ 455/11.1
6,603,577 B1 * 8/2003 Ravishankar et al. ....... 358/434

FOREIGN PATENT DOCUMENTS

| | | |
|---|---|---|
| JP | 03-041874 | 2/1991 |
| JP | 04-035570 | 2/1992 |
| JP | 06-113086 | 4/1994 |
| JP | 07-087292 | 3/1995 |
| JP | 09-247404 | 9/1997 |
| JP | 10-164331 | 6/1998 |

* cited by examiner

FIG. 4

| 00 | 01 | 02 | 03 | 04 | 05 | ..... |
|---|---|---|---|---|---|---|
| NSS CODE | CCITT MEMBER'S CODE | MAKER CODE | TRANSMISSION TO TERMINAL WITH FREE MEMORY | SIZE INFORMATION FOR IMAGE TO BE TRANSMITTED | ..... | ..... |

FIF (FACSIMILE INFORMATION FIELDS) spans columns 01 through 05+

FIG. 5

| 00 | 01 |
|---|---|
| SOR CODE | WAITING PERIOD T1 |

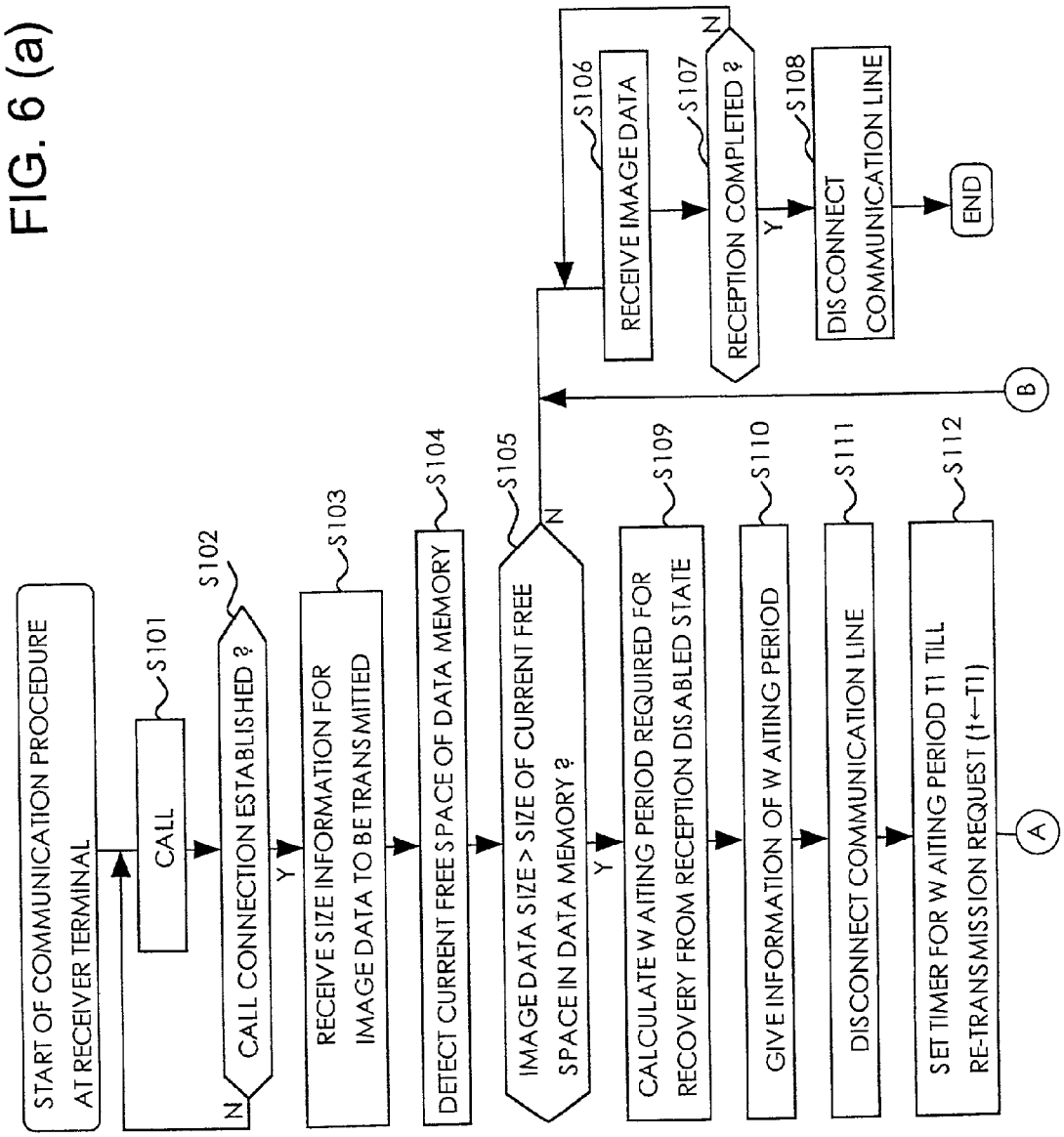

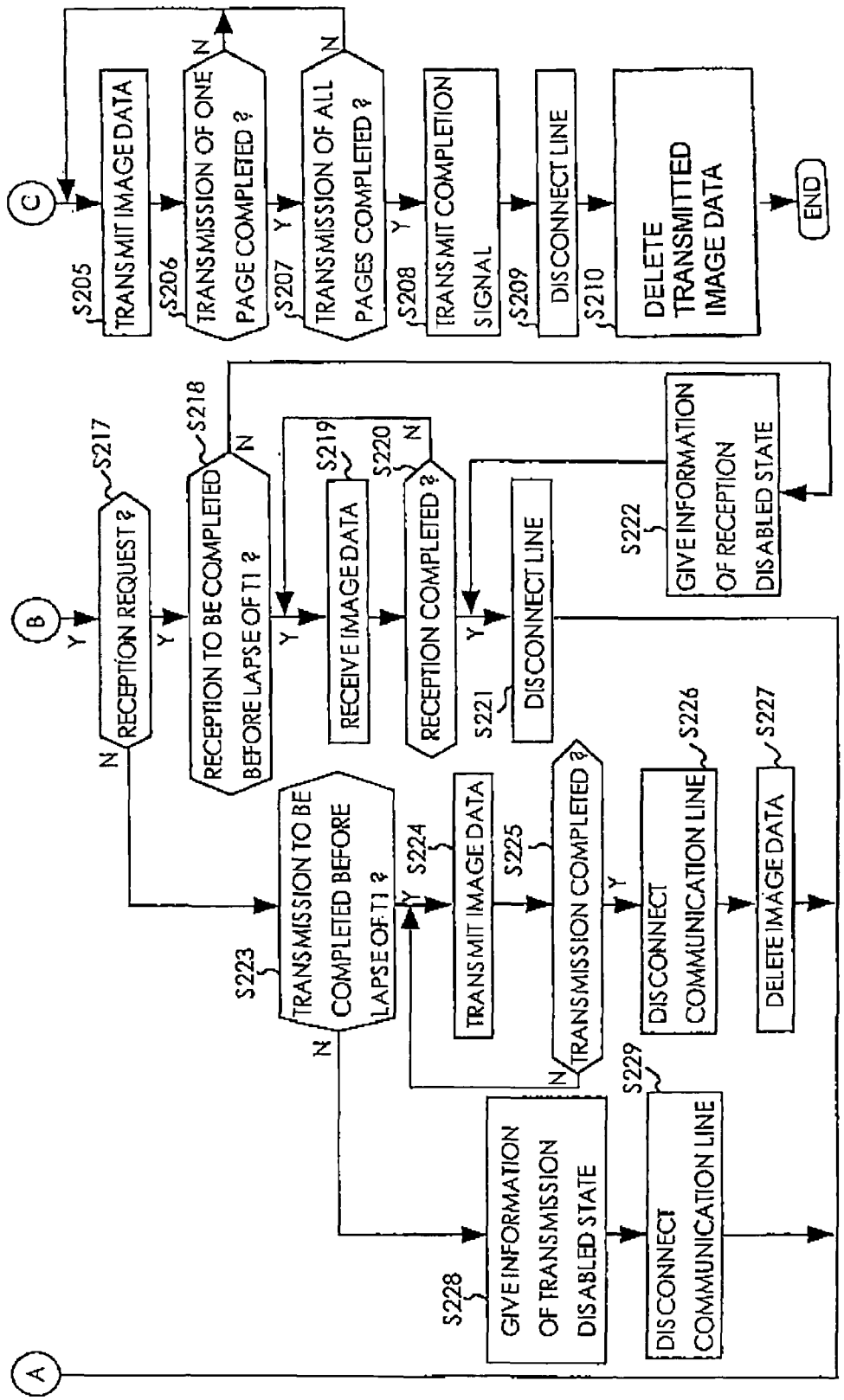

COMMUNICATION SYSTEM AND METHOD, AND STORAGE MEDIUM FOR THE SYSTEM

CROSS-REFERENCE TO RELATED APPLICATION

This application is related to Japanese Patent Application No. 2000-110856 filed on Apr. 12, 2000, whose priority is claimed under 35 USC § 119, the disclosure of which is incorporated by reference in its entirety.

BACKGROUND OF THE INVENTION

1. Field of the Invention

The present invention relates to a communication system, a communication method and a storage medium for the system, which are applicable to a facsimile machine having a memory function, a complex copying machine having a communication function and an information terminal having a communication function for prevention of a communication failure which may occur due to a shortage of free memory space in a receiver terminal.

2. Description of the Related Art

In recent years, facsimile machines having a memory function have become widely available. Such a facsimile machine is adapted to transmit data after storing the data in a memory when functioning as a transmitter terminal, so that the data can be re-transmitted even if a line is busy. Further, the facsimile machine is adapted to print out received data after temporarily storing the data when functioning as a receiver terminal.

When a great amount of received data is accumulated in the memory of the receiver terminal, however, the data overflows the memory during the data reception, so that data thereafter received cannot be stored in the memory. This causes a communication failure due to a shortage of the capacity of the memory.

One conventional approach to this problem is a facsimile communication method disclosed, for example, in Japanese Unexamined Patent Publication No. 2-216972 (1990). In this method, a receiver terminal transmits a communication protocol signal containing information of an available memory space (residual memory capacity) to a transmitter terminal, and the transmitter terminal transmits data to the receiver terminal in accordance with the residual memory capacity of the receiver terminal.

Japanese Unexamined Patent Publication No. 6-113086 (1994) proposes a facsimile machine, which is adapted to reduce the pixel density (resolution) of received image data to store a reduced amount of the image data when a residual memory capacity of an image memory thereof is reduced to lower than a predetermined level, and request a transmitter terminal to re-transmit the original image data thereto when the residual memory capacity of the image memory is restored to not lower than the predetermined level.

Japanese Unexamined Patent Publication No. 10-164331 (1998) proposes a facsimile machine, which is adapted to transmit a memory-over signal to a transmitter terminal and disconnect a line, when an image memory thereof becomes full, to cause the transmitter terminal to stop transmitting image data and store pages of image data and, when a free space in the image memory is increased, call the transmitter terminal to cause the transmitter terminal to transmit thereto the stored image data pages.

The facsimile machines disclosed in Japanese Unexamined Patent Publication Nos. 2-216972, 6-113086 and 10-164331 cause the transmitter terminal to transmit the data in accordance with the residual memory capacity of the memory upon reception of information that the residual memory capacity of the memory is reduced, and re-transmit the data upon reception of information that the free space in the memory is restored for prevention of a communication failure due to the shortage of the free memory space.

Where the data is transmitted in accordance with the residual memory capacity of the memory, the transmitter terminal should transmit a portion of the data untransmitted at the previous data transmission or all the data again to the receiver facsimile machine. Thus, the transmitter terminal has to perform unnecessary data transmission or wait for notification of the recovery from the shortage of the free memory space. Therefore, time until the transmission is permitted cannot efficiently be utilized.

In view of the foregoing, the present invention is directed to a communication system and a communication method, which can suppress unnecessary inquiry between a transmitter terminal and a receiver terminal and time-wasting data transmission to the receiver terminal, when a storage section of the receiver terminal is short of free space, by preliminarily providing a waiting period required for recovery from the shortage of the free space in the storage section of the receiver terminal and causing the transmitter terminal to transmit data after the lapse of the waiting period. The invention is further directed to a storage medium for the communication system.

SUMMARY OF THE INVENTION

In accordance with the present invention, there is provided a communication system serving as a transmitter terminal and a receiver terminal for communications with a second communication system via a communication line, the communication system comprising: a storage section for data storage; a communication section for data communications, the communication section being adapted for reception and transmission of data and size information indicative of the size of the data with respect to the second communication system; a detection section for detecting a free space in the storage section; a comparing section for comparing the data size contained in the size information with the size of the free space in the storage section; a calculating section for, if the storage section is short of free space for accommodation of the data size, calculating a waiting period required for recovery from the shortage of the free space in the storage section; and a timer section for timing the lapse of the waiting period.

When the communication system functions as the receiver terminal, the communication section requests the second communication system to transmit the data and the size information thereto, and receives the size information from the second communication system. If the size of the free space in the storage section is smaller than the data size contained in the size information, the communication section gives information of a reception disabled state thereof and the waiting period to the second communication system, and causes the second communication system to transmit the data thereto after the lapse of the waiting period.

With this arrangement, time-wasting data transmission and unnecessary inquiry between the communication systems can be suppressed by preliminarily providing the waiting period required for the recovery from the shortage of the free space in the storage section and causing the second communication system to transmit the data after the lapse of the waiting period.

BRIEF DESCRIPTION OF THE DRAWINGS

FIG. 4 is a diagram illustrating the frame configuration of a signal NSS indicative of a non-standard function of the transmitter terminal according to the embodiment;

FIG. 5 is a diagram illustrating the frame configuration of a signal SOR indicative of the shortage of the free memory space in the receiver terminal according to the embodiment;

DETAILED DESCRIPTION OF THE INVENTION

Figure 1:
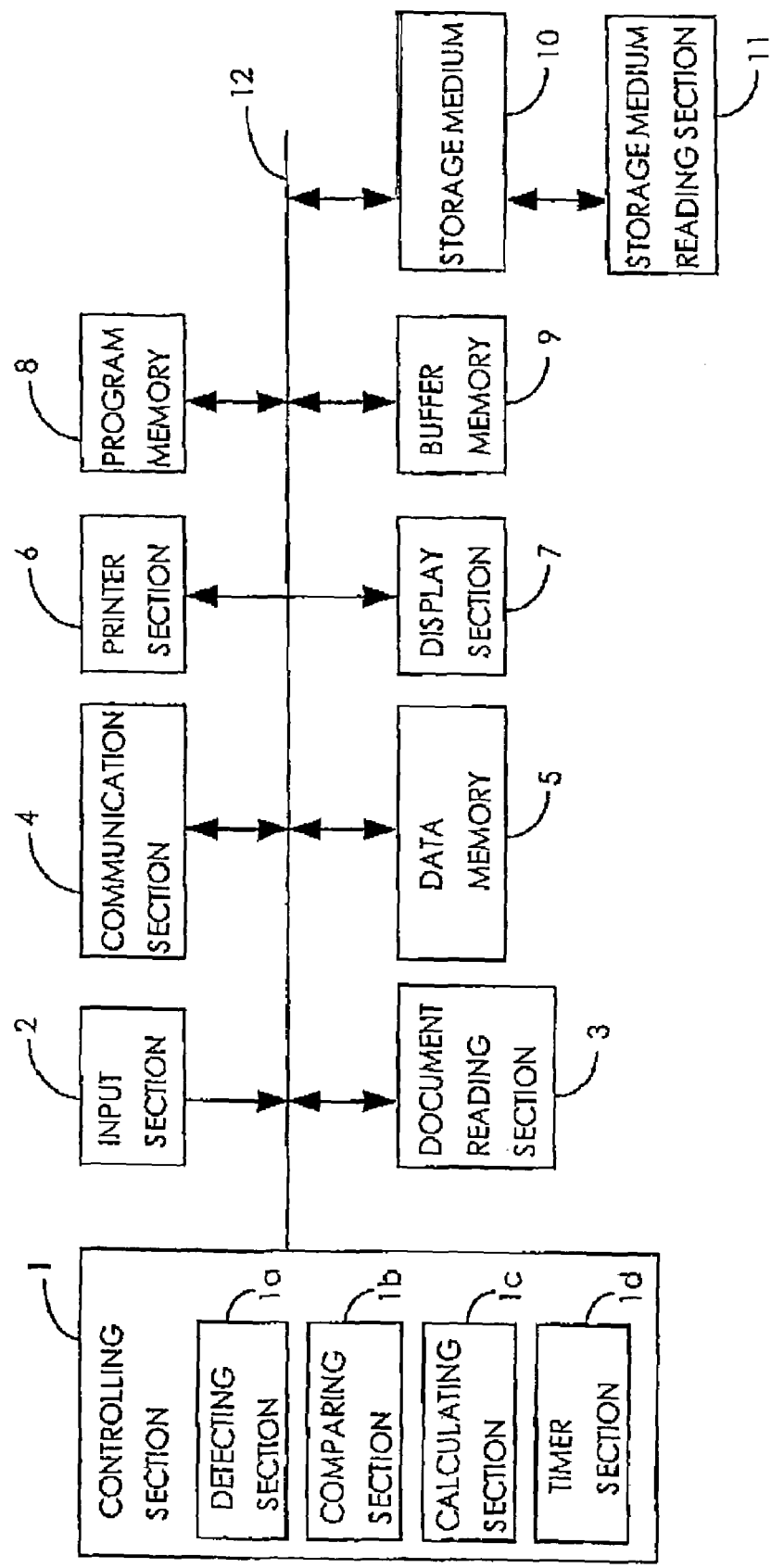
FIG. 1 is a block diagram illustrating the hardware configuration of a communication system according to one embodiment of the present invention.

A communication system according to the present invention comprises a transmitter terminal and a receiver terminal for communications therebetween via a communication line, the receiver terminal comprising: a storage section for storing data for the communications; a communication section for requesting the transmitter terminal to transmit data and size information indicative of the size of the data; a detecting section for detecting a free space in the storage section; a comparing section for comparing the data size contained in the size information transmitted from the transmitter terminal with the size of the free space in the storage section; a calculating section for, if the storage section is short of free space for accommodation of the data size, calculating a waiting period required for recovery from the shortage of the free space in the storage section; and a timer section for timing the lapse of the waiting period; wherein if the size of the free space in the storage section is smaller than the data size contained in the size information, the communication section gives information of a reception disabled state of the receiver terminal and the waiting period to the transmitter terminal and, after the lapse of the waiting period, causes the transmitter terminal to transmit the data to the receiver terminal.

In the present invention, the transmitter terminal and the receiver terminal may each be a facsimile machine, an information processing system having a communication function, a complex copying machine or the like.

The data may be image data, an E-mail or the like.

In accordance with the present invention, time-wasting data transmission to the receiver terminal and unnecessary inquiry between the transmitter terminal and the receiver terminal can be suppressed by preliminarily providing the waiting period required for the recovery from the shortage of the free space in the storage section of the receiver terminal and causing the transmitter terminal to transmit the data after the lapse of the waiting period.

If a data reception request is received from any other external terminal before the lapse of the waiting period, the communication section of the receiver terminal may give information of a reception disabled state thereof to the external terminal, and be prohibited from data reception.

With this arrangement, reduction in the free space in the storage section of the receiver terminal can be prevented.

If a data transmission request is received from any other external terminal before the lapse of the waiting period, the communication section of the receiver terminal may transmit data to the external terminal on condition that the data to the external terminal has a size such that the data transmission can be completed before the lapse of the waiting period.

With this arrangement, the receiver terminal can promote the recovery from the shortage of the free space in the storage section by transmitting the data to the external terminal before the lapse of the waiting period, and efficiently utilize the waiting period until the free space of the storage section is restored.

The transmitter terminal comprises: a storage section for storing data for the communications; a communication section for receiving a request for transmission of data and size information indicative of the size of the data from the receiver terminal, transmitting the size information to the receiver terminal, and receiving information of the waiting period required for the recovery from the shortage of the free space in the storage section from the receiver terminal; and a timer for timing the lapse of the waiting period; wherein the communication section disconnects a line connection to the receiver terminal and, after the lapse of the waiting period, establishes the line connection to the receiver terminal again.

With this arrangement, the transmitter terminal does not have to try to establish the line connection to the receiver terminal again and again, because the line connection to the receiver terminal can assuredly be established for the transmission of the data after the lapse of the waiting period.

If a data transmission request is received from any other external terminal before the lapse of the waiting period, the communication section of the transmitter terminal may transmit data to the external terminal on condition that the data to the external terminal has a size such that the data transmission can be completed before the lapse of the waiting period.

With this arrangement, the transmitter terminal can transmit the data to the external terminal before the lapse of the waiting period.

If a data reception request is received from any other external terminal before the lapse of the waiting period, the communication section of the transmitter terminal may receive data from the external terminal on condition that the data from the external terminal has a size such that the data reception can be completed before the lapse of the waiting period.

With this arrangement, the transmitter terminal can receive the data from the external terminal before the lapse of the waiting period.

In accordance with another aspect of the present invention, there is provided a method for communications between a transmitter terminal and a receiver terminal via a communication line, the method comprising the steps of: causing a storage section of the receiver terminal to store communication data; causing a communication section of the receiver terminal to request the transmitter terminal to transmit data and size information indicative of the size of the data; causing a detection section of the receiver terminal to detect a free space in the storage section of the receiver terminal; causing a comparing section of the receiver terminal to compare the data size contained in the size information with the size of the free space in the storage section of the receiver terminal; causing a calculating section of the receiver terminal, if the storage section of the receiver terminal is short of free space for accommodation of the data size, to calculate a waiting period required for recovery from the shortage of the free space in the storage section; causing a timer section of the receiver terminal to time the lapse of the waiting period; causing the communication section of the receiver terminal, if the size of the free space in the storage section of the receiver terminal is smaller than the data size contained in the size information, to give information of a reception disabled state of the receiver terminal and the waiting period to the transmitter terminal; and causing the transmitter terminal to transmit the data to the receiver terminal after the lapse of the waiting period.

In accordance with further another aspect of the present invention, there is provided a storage medium storing therein a computer-executable communication program for communications between a transmitter terminal and a receiver terminal via a communication line, the communication program performing the functions of: causing a storage section of the receiver terminal to store communication data; causing a communication section of the receiver terminal to request the transmitter terminal to transmit data and size information indicative of the size of the data; causing a detection section of the receiver terminal to detect a free space in the storage section of the receiver terminal; causing a comparing section of the receiver terminal to compare the data size contained in the size information with the size of the free space in the storage section of the receiver terminal; causing a calculating section of the receiver terminal, if the storage section of the receiver terminal is short of free space for accommodation of the data size, to calculate a waiting period required for recovery from the shortage of the free space in the storage section; causing a timer section of the receiver terminal to time the lapse of the waiting period; causing the communication section of the receiver terminal, if the size of the free space in the storage section of the receiver terminal is smaller than the data size contained in the size information, to give information of a reception disabled state of the receiver terminal and the waiting period to the transmitter terminal; and causing the transmitter terminal to transmit the data to the receiver terminal after the lapse of the waiting period.

The present invention will hereinafter be described in detail by way of an embodiment thereof. It should be understood that the invention be not limited to the embodiment.

The communication system according to the present invention is applicable to a facsimile machine having a memory function, a complex copying machine having a communication function, an information terminal or the like.

An explanation will be given to a communication process to be performed by the communication system serving as a transmitter terminal and a receiver terminal in the following embodiment.

FIG. 1 is a block diagram illustrating the hardware configuration of the communication system according to the embodiment of the present invention. As shown in FIG. 1, the communication system includes a controlling section 1, an input section 2, a document reading section 3, a communication section 4, a data memory 5, a printer section 6, a display section 7, a program memory 8, a buffer memory 9, a storage medium 10, a storage medium reading section 11, and a bus 12.

The controlling section 1 is comprised of a computer such as including a CPU, a ROM, a RAM and I/O ports, and adapted to control respective components of the system on the basis of control programs stored in the program memory 8.

The controlling section 1 includes a detecting section 1a for detecting a free space in the data memory 5 (storage section), a comparing section 1b for comparing data size contained in size information with the size of the free space in the data memory 5, a calculating section 1c for, if the data memory 5 is short of free space for accommodation of the data size, calculating a waiting period required for recovery from the shortage of the free space, and a timer section 1d for timing the lapse of the waiting period.

The input section 2 includes a keyboard, a mouse, and a pen and a tablet, for example, to perform various input operations on the system.

The document reading section 3 includes a CCD scanner and a CCD camera, for example, and is adapted to optically read a printed document image and convert the image into image data.

The communication section 4 includes a modem, a communication line establishing circuit and an interface, for example, and is adapted to acquire various necessary data such as image data and E-mails from external terminals via a communication line and transmit various data to the external terminals. The communication section 4 requests an external terminal (transmitter terminal) to transmit data and size information indicative of the size of the data. If the size of the free space in the data memory 5 (storage section) is smaller than the data size contained in the size information, the communication section 4 gives information of a reception disabled state thereof and the waiting period to the external terminal. After the lapse of the waiting period, the communication section 4 causes the transmitter terminal to transmit the data thereto.

The data memory 5 is comprised of a RAM, an EEPROM, a floppy disk, a hard disk and/or the like, for example, and adapted to store various data including the image data and the E-mails acquired from the external terminals connected to the communication section 4 via the communication line by the controlling section 1.

The printer section 6 is comprised of a thermal head printer, an ink jet printer, a laser printer or the like, for example, and adapted to print any of the image data, the E-mails and the like stored in the data memory 5.

The display section 7 is comprised of a liquid crystal display (LCD), a plasma display (PD), an electroluminescent display (ELD) or the like, for example, and adapted to display any of the image data, the E-mails and the like stored in the data memory 5.

The program memory 8 is comprised of a ROM, an EEPROM, a floppy disk, a hard disk, a CD-ROM, an MD and/or the like, for example, and stores control programs and communication programs on the basis of which the controlling section 1 controls the respective components of the system.

The buffer memory 9 is comprised of a RAM, an EEPROM, a floppy disk, a hard disk, a CD-ROM, an MD and/or the like, for example, and has a storage space for temporarily storing various executable data when the controlling section 1 controls the respective components.

The storage medium 10 is comprised of a RAM, an EEPROM, a floppy disk (FD), a hard disk (HD), a CD- ROM, an MD or the like, for example, which is separable from the system. The storage medium 10 is generally utilized in a communication system serving as a transmitter terminal and a receiver terminal for transmitting and receiving data via a communication line. The storage medium 10 stores therein a communication program which is executable by the computer of the controlling section 1 of the communication system serving as the receiver terminal to perform the functions of: causing the data memory 5 to store communication data; causing the communication section 4 to request the transmitter terminal to transmit data and size information indicative of the size of the data; causing the detecting section 1a to detect a free space in the data memory 5; causing the comparing section 1b to compare the data size contained in the size information with the size of the free space in the data memory 5; causing the calculating section 1c, if the data memory 5 is short of free space for accommodation of the data size, to calculate a waiting period required for recovery from the shortage of the free space; causing the timer section 1d to time the lapse of the waiting period; and causing the communication section 4, if the size of the free space in the data memory 5 is smaller than the data size contained in the size information, to give information of a reception disabled state of the receiver terminal and the waiting period to the transmitter terminal to cause the transmitter terminal to transmit the data to the receiver terminal after the lapse of the waiting period.

The storage medium reading section 11 is comprised of an FDD), an HDD, a CD-ROMD, an MDD or the like, for example, which includes a driving section for driving the storage medium 10 in accordance with the form thereof, and a reading circuit. The storage medium reading section 11 installs the inventive communication program from the storage medium 10 into the program memory 8. Thus, the inventive communication system is implemented.

The bus 12 transmits various data when the controlling section 1 controls the respective components of the system.

Figure 2:
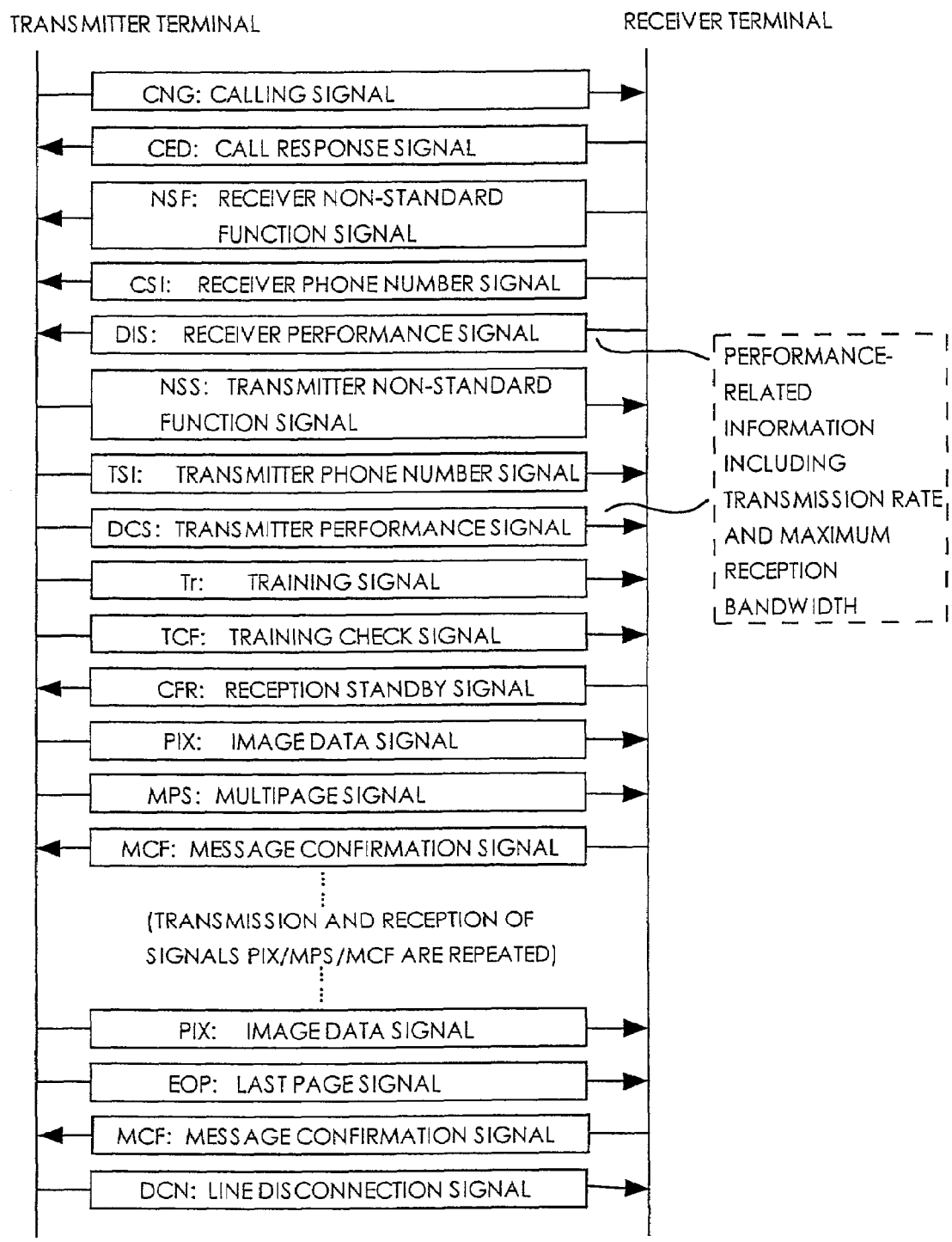
FIG. 2 is a diagram for explaining signals and a communication procedure to be employed for transmitting data from a transmitter terminal to a receiver terminal when the receiver terminal has a sufficient free memory space in accordance with the embodiment.

FIG. 2 is a diagram for explaining signals and a communication procedure to be employed for transmitting data from the transmitter terminal to the receiver terminal when the receiver terminal has a sufficient free memory space. With reference to FIG. 2, an explanation will be given to the signals to be sent between the transmitter terminal and the receiver terminal.

First, the transmitter terminal transmits a calling signal CNG to the receiver terminal. Upon recognition of the signal CNG, the receiver terminal successively transmits to the transmitter terminal a call response signal CED, a signal NSF indicative of a confidential function and a non-standard function of the receiver terminal having a sufficient free memory space at the data transmission according to this embodiment, a signal CSI indicative of a phone number of the receiver terminal, and a signal DIS indicative of the performance of the receiver terminal such as a transmission rate and a maximum reception bandwidth.

In turn, the transmitter terminal successively transmits to the receiver terminal a signal NSS indicative of a confidential function and a non-standard function of the transmitter terminal having a sufficient free memory space at the data transmission according to this embodiment (containing size information indicative of the size of image data to be transmitted, see FIG. 4), a signal TSI indicative of a phone number of the transmitter terminal, a signal DCS indicative of the performance of the transmitter terminal such as a transmission rate and a maximum reception bandwidth, a training signal Tr, and a training check signal TCF.

FIG. 4 is a diagram illustrating the frame configuration of the signal NSS indicative of the non-standard function of the transmitter terminal of this embodiment.

Upon completion of training, the receiver terminal returns to the transmitter terminal a signal CFR indicative of the completion of reception standby operation. Then, the transmitter terminal starts transmitting an image data signal PIX. Where a plurality of pages of data are to be transmitted, the transmitter terminal transmits a multipage signal MPS after transmission of the first page image data signal PIX.

Upon recognition of the signal MPS, the receiver terminal returns a message confirmation signal MCF to the transmitter terminal. The transmission and reception of signals PIX/MPS/MCF are repeated a number of times corresponding to the number of the pages of the data to be transmitted. Upon reception of an image data signal PIX for the last page, the transmitter terminal transmits a last page signal EOP to the receiver terminal.

Upon recognition of the signal LOP, the receiver terminal returns a message confirmation signal MCF to the transmitter terminal. Finally, the transmitter terminal transmits a line disconnection signal DCN to the receiver terminal to disconnect the line in this state.

Figure 3:
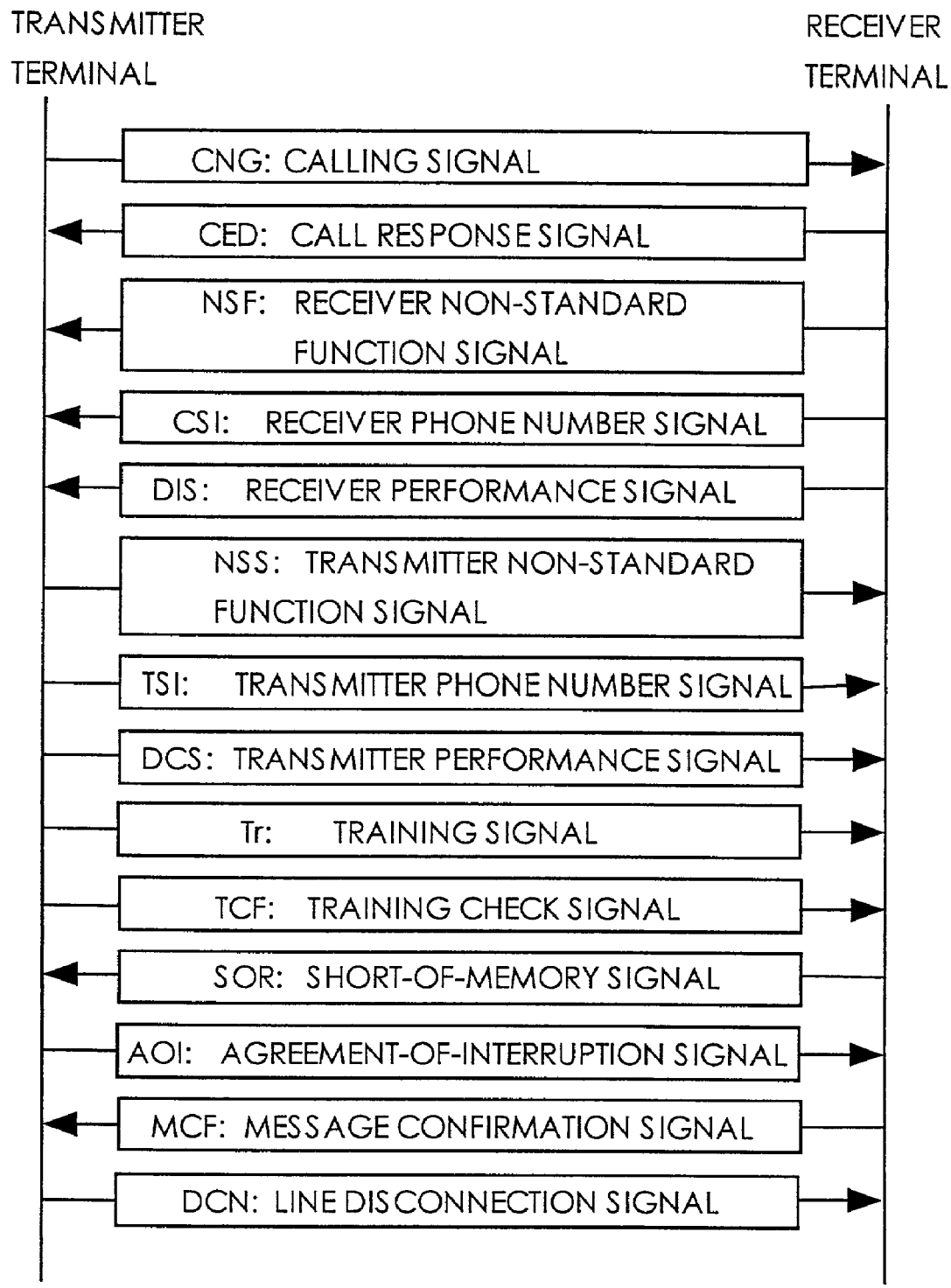
FIG. 3 is a diagram for explaining signals and a communication procedure to be employed for transmitting data from the transmitter terminal to the receiver terminal when the receiver terminal has an insufficient free memory space in accordance with the embodiment.

FIG. 3 is a diagram for explaining signals and a communication procedure to be employed for transmitting data from the transmitter terminal to the receiver terminal when the receiver terminal has an insufficient free memory space. With reference to FIG. 3, an explanation will be given to the signals to be sent between the transmitter terminal and the receiver terminal.

The signal transmission and reception before the transmission of the signal TCF are carried out in the same manner as shown in FIG. 2. However, the receiver terminal which has an insufficient free memory space transmits a short-of-memory signal SOR to indicate that the reception terminal is currently in a reception disabled state and will be brought into a reception enabled state after the lapse of a waiting period T1 (see FIG. 5).

FIG. 5 is a diagram illustrating the frame configuration of the signal SOR indicative of the shortage of the free memory space in the receiver terminal in accordance with this embodiment.

Upon reception of the short-of-memory signal SOR, the transmitter terminal transmits to the receiver terminal an agreement-of-interruption signal AOI to indicate that the interruption of the transmission is agreed. Upon reception of the agreement-of-interruption signal AOI, the receiver terminal transmits a message confirmation signal MCF to the transmitter terminal. Upon reception of the message confirmation signal MCF, the transmitter terminal transmits a line disconnection signal DCN to the receiver terminal to disconnect the line in this state.

Figure 6:
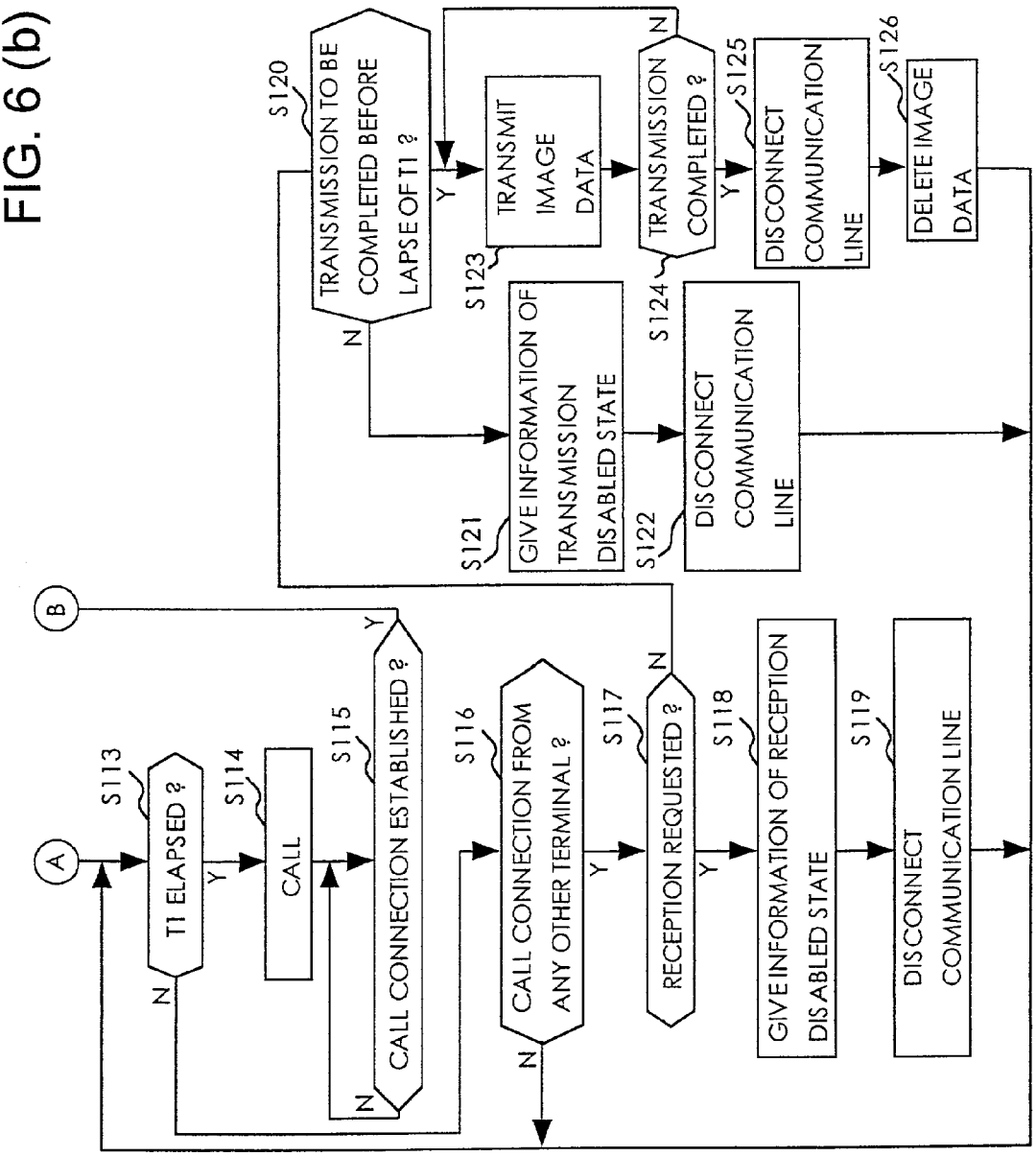
FIG. 6(a) and FIG. 6(b) are flow charts for explaining a communication procedure to be performed by the receiver terminal according to the embodiment.

FIG. 6 is a flow chart for explaining a communication procedure to be performed by the receiver terminal. In FIG. 6, the receiver terminal performs the communication procedure in communication with the transmitter terminal under the control of the controlling section 1.

S101: The receiver terminal calls the transmitter terminal, and requests transmission of image data and size information indicative of the size of the image data.

102: The receiver terminal checks if a call connection from the transmitter terminal is established.

S103: If the call connection is established, the receiver terminal receives an NSS signal (size information indicative of the image data size) transmitted from the transmitter terminal.

S104: The receiver terminal reads the size information in the NSS signal transmitted from the transmitter terminal, and detects a free space in the data memory 5 (residual memory capacity).

S105: The receiver terminal compares the image data size contained in the size information with the size of the free space in the data memory 5.

S106: If it is determined in Step S105 that the image data size is not greater than the size of the free space in the data memory 5, i.e., the data memory 5 has a sufficient free space, the receiver terminal receives the image data and stores the image data in the data memory 5.

S107: The receiver terminal checks if the reception of the image data is completed on the basis of detection of an EOP signal from the transmitter terminal.

S108: If the image data is completely received and stored in the data memory 5, the receiver terminal disconnects the line.

S109: If it is determined in Step S105 that the image data size is greater than the size of the free space in the data memory 5, i.e., the data memory has an insufficient free space, the receiver terminal calculates a waiting period required for recovery from the shortage of the free memory space.

S110: The receiver terminal transmits an SOR signal to the transmitter terminal to give information of the reception disabled state of the receiver terminal and the waiting period to the transmitter terminal.

S111: The receiver terminal disconnects the communication line.

S112: The receiver terminal sets the timer (t), and times the lapse of the waiting period (T1) required for the recovery from the shortage of the free memory space.

S113: The receiver terminal checks if the waiting period has elapsed (t=T1).

S114: When the shortage of the free space in the data memory 5 is eliminated after the lapse of the waiting period T1, the receiver terminal calls the transmitter terminal via the communication line to request re-transmission of the image data.

S115: The receiver terminal checks if a call connection to the transmitter terminal is established. If not, the receiver terminal waits for the establishment of the call connection. After the establishment of the call connection to the transmitter terminal, the receiver terminal performs the process sequence from Step S106 to Step S108.

S116: If it is determined in Step S113 that the waiting period has not elapsed yet, the receiver terminal checks if a call connection from any other external terminal is established.

S117: The receiver terminal checks whether the external terminal requests image data reception or image data transmission.

S118: If the external terminal requests the image data reception, the receiver terminal gives information of the reception disabled state of the receiver terminal to the external terminal.

S119: The receiver terminal disconnects the communication line, and waits for the lapse of the waiting period T1.

S120: If it is determined in Step S117 that the external terminal requests the image data transmission, the receiver terminal checks if image data to be transmitted to the external terminal has a size such that the image data transmission can be completed before the lapse of the waiting period T1.

S121: If the image data to be transmitted to the external terminal has a size that does not permit the image data transmission to be completed before the lapse of the waiting period T1, the receiver terminal gives information of a transmission disabled state of the receiver terminal to the external terminal.

S122: The receiver terminal disconnects the communication line.

S123: If it is determined in Step S120 that the image data to be transmitted to the external terminal has a size that permits the image data transmission to be completed before the lapse of the waiting period T1, the receiver terminal transmits the image data to the external terminal.

S124: The receiver terminal checks if the image data transmission is completed.

S125: Upon the completion of the image data transmission, the receiver terminal disconnects the communication line.

S126: The receiver terminal deletes the transmitted image data from the data memory 5.

Figure 7:
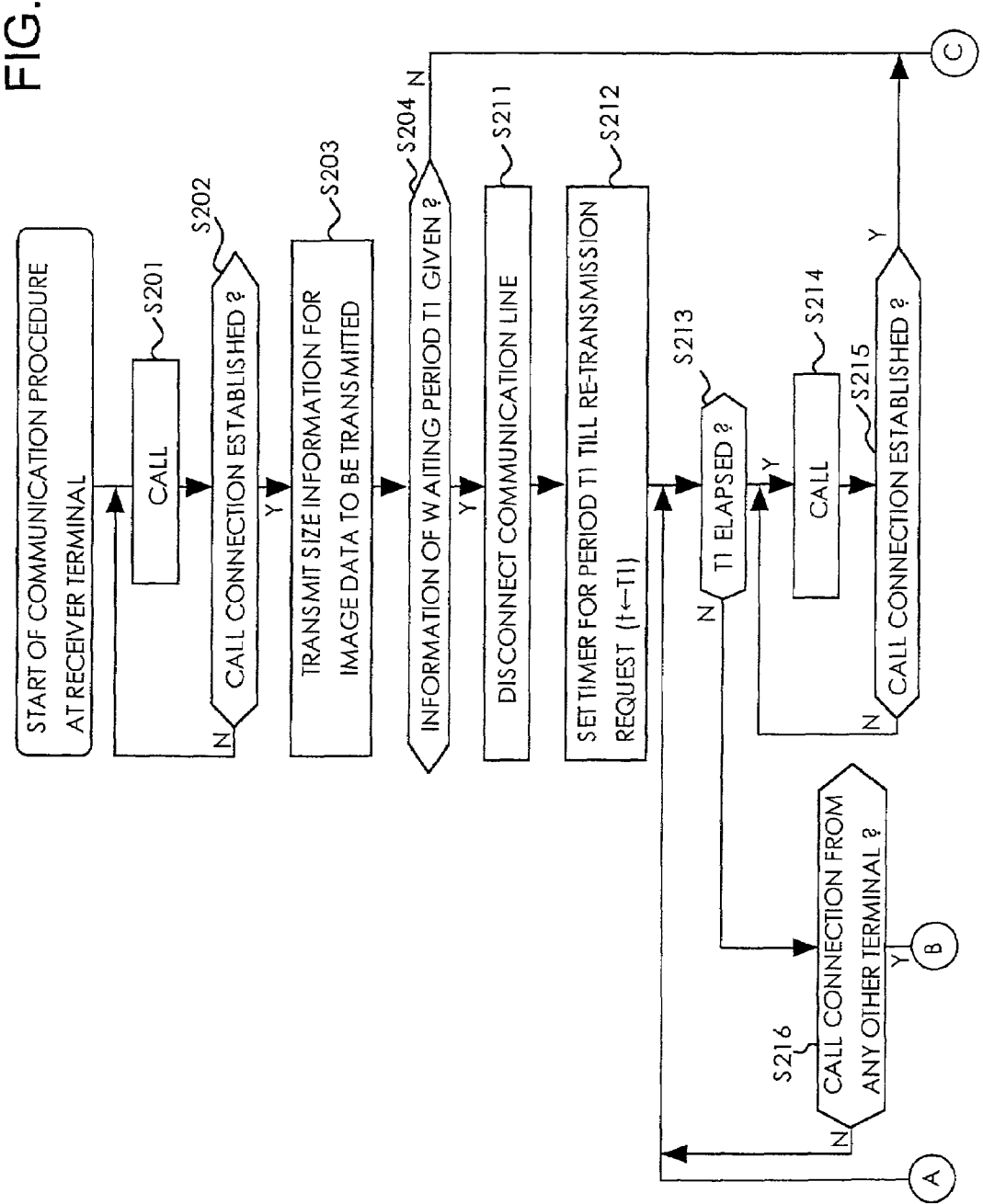
FIG. 7(a) and FIG. 7(b) are flow charts for explaining a communication procedure to be performed by the transmitter terminal according to the embodiment.

FIG. 7 is a flow chart for explaining a communication procedure to be performed by the transmitter terminal according to this embodiment. In FIG. 7, the transmitter terminal performs the communication procedure in communication with the receiver terminal under the control of the controlling section 1.

S201: The transmitter terminal calls the receiver terminal.

S202: The transmitter terminal checks if a call connection to the receiver terminal is established.

S203: If the receiver terminal requests transmission of size information indicative of the size of image data to be transmitted from the transmitter terminal, the transmitter terminal transmits an NSS signal containing the size information to the receiver terminal before the transmission of the image data.

S204: The transmitter terminal checks if the receiver terminal gives information of a waiting period T1 required for recovery from the shortage of the free memory space because the image data size is greater than the size of the free space in the data memory of the receiver terminal.

S205: If the information of the waiting period T1 is not given, the transmitter terminal transmits the image data to the receiver terminal.

S206: The transmitter terminal checks if transmission of a page of image data is completed.

S207: The transmitter terminal checks if transmission of all pages of image data is completed.

S208: The transmitter terminal transmits an EOP signal indicative of completion of the image data transmission to the receiver terminal.

S209: The transmitter terminal disconnects the communication line connected to the receiver terminal.

S210: The transmitter terminal deletes the transmitted image data from the data memory.

S211: If it is determined in Step S204 that an SOR signal indicative of the waiting period is received, the transmitter terminal disconnects the communication line.

S212: The transmitter terminal sets the timer (t), and times the lapse of the waiting period (T1).

S213: The transmitter terminal checks if the waiting period has elapsed (t=T1).

S214: When the shortage of the free space in the data memory of the receiver terminal is eliminated after the lapse of the waiting period T1, the transmitter terminal calls the receiver terminal via the communication line.

S215: The transmitter terminal checks if a call connection to the receiver terminal is established. If not, the transmitter terminal waits for the establishment of the call connection. After the establishment of the call connection to the receiver terminal, the transmitter terminal performs the process sequence from Step S205 to Step S210.

S216: If it is determined in Step S213 that the waiting period T1 has not elapsed yet, the transmitter terminal checks if a call connection from any other external terminal is established.

S217: If the call connection from the external terminal is established, the transmitter terminal checks whether the external terminal requests image data reception or image data transmission.

S218: If the external terminal requests the image data reception, the transmitter terminal checks if image data to be received from the external terminal has a size such that the image data reception can be completed before the lapse of the waiting period T1.

S219: If the image data to be received from the external terminal has a size that permits the image data reception to be completed before the lapse of the waiting period T1, the transmitter terminal receives the image data from the external terminal.

S220: The transmitter terminal checks if the image data reception is completed.

S221: If the image data reception is completed, the transmitter terminal disconnects the communication line, and returns to Step S213.

S222: If it is determined in Step S218 that the image data to be received from the external terminal has a size that does not permit the image data reception to be completed before the lapse of the waiting period T1, the transmitter terminal gives information of a reception disabled state of the transmitter terminal to the external terminal, and goes to Step S221.

S223: If it is determined in Step S217 that the external terminal requests the image data transmission, the transmitter terminal checks if image data to be transmitted to the external terminal has a size such that the image data transmission can be completed before the lapse of the waiting period T1.

S224: If the image data to be transmitted to the external terminal has a size that permits the image data transmission to be completed before the lapse of the waiting period T1, the transmitter terminal transmits the image data to the external terminal.

S225: The transmitter terminal checks if the image data transmission is completed.

S226: If the image data transmission is completed, the transmitter terminal disconnects the communication line.

S227: The transmitter terminal deletes the transmitted image data from the data memory, and returns to Step S213.

S228: If it is determined in Step S223 that the image data to be transmitted to the external terminal has a size that does not permit the image data transmission to be completed before the lapse of the waiting period T1, the transmitter terminal gives information of a transmission disabled state of the transmitter terminal to the external terminal.

S229: The transmitter terminal disconnects the communication line connected to the external terminal, and returns to Step S213.

In accordance with the present invention, the transmitter terminal is adapted to preliminarily acquire information indicative of a data reception possible period from the receiver terminal having an insufficient free space in the data memory, and transmit data to the receiver terminal during the data reception possible period, whereby time-wasting data transmission to the receiver terminal and unnecessary inquiry between the transmitter terminal and the receiver terminal can be suppressed.

What is claimed is:

1. A communication system serving as a transmitter terminal and a receiver terminal for communications with a second communication system via a communication line, the communication system comprising:
a storage section for data storage;
a communication section for data communications, the communication section being adapted for reception and transmission of data and size information indicative of the size of the data with respect to the second communication system;
a detection section for detecting a free space in the storage section;
a comparing section for comparing the data size contained in the size information with the size of the free space in the storage section;
a calculating section for, if the storage section is short of free space for accommodation of the data size, calculating a waiting period required for recovery from the shortage of the free space in the storage section; and
a timer section for timing the lapse of the waiting period such that upon expiration of the waiting period, the receiver terminal calls the transmitter terminal to request re-transmission of the data.

2. A communication system as set forth in claim 1,
wherein, when the communication system functions as the receiver terminal, the communication section requests the second communication system to transmit the data and the size information thereto, and receives the size information from the second communication system,
wherein, if the size of the free space in the storage section is smaller than the data size contained in the size information, the communication section gives information of a reception disabled state thereof and the waiting period to the second communication system, and causes the second communication system to transmit the data thereto after the lapse of the waiting period.

3. A communication system as set forth in claim 2,
wherein, if a data reception request is received from any other external terminal before the lapse of the waiting period when the communication system functions as the receiver terminal, the communication section gives information of the reception disabled state thereof to the external terminal, and is prohibited from data reception.

4. A communication system as set forth in claim 2,
wherein, if a data transmission request is received from any other external terminal before the lapse of the waiting period when the communication system functions as the receiver terminal, the communication section transmits data to the external terminal on condition that the data to the external terminal has a size such that the data transmission can be completed before the lapse of the waiting period.

5. A communication system as set forth in claim 1,
wherein, when the communication system functions as the transmitter terminal, the communication section receives a request for transmission of die data and the size information from the second communication system and, in response to the request, transmits the size information to the second communication system,
wherein, if a storage section of the second communication system is short of free space, the communication section receives from the second communication system a waiting period required for recovery from the shortage of the free space in the storage section of the second communication system, disconnects the communication line and, after the lapse of the waiting period, establishes a line connection again to the second communication system to transmit the data to the second communication system.

6. A communication system as set forth in claim 5, wherein, if a data transmission request is received from any other external terminal before the lapse of the waiting period when the communication system functions as the transmitter terminal, the communication section transmits data to the external terminal on condition that the data to the external terminal has a size such that the data transmission can be completed before the lapse of the waiting period.

7. A communication system as set forth in claim 5, wherein, if a data reception request is received from any other external terminal before the lapse of the waiting period when the communication system functions as the transmitter terminal, the communication section receives data from the external terminal on condition that the data from the external terminal has a size such that the data reception can be completed before the lapse of the waiting period.

8. A communication system as set forth in claim 1, which is a facsimile machine.

9. A communication system as set forth in claim 1, which is an information processing system having a communication function.

10. A communication system as set forth in claim 2 or 5, wherein the data is image data.

11. A communication system as set forth in claim 2 or 5, wherein the data is an E-mail.

12. A method for communications between a transmitter terminal and a receiver terminal via a communication line, the method comprising the steps of:
    causing a communication section of the receiver terminal to request transmission of data and size information indicative of the size of the data from the transmitter terminal;
    causing a detection section of the receiver terminal to detect a free space in a storage section of the receiver terminal;
    causing a comparing section of the receiver terminal to compare the data size contained in the size information with the size of the free space in the storage section of the receiver terminal;
    if the storage section or the receiver terminal has a sufficient free space for accommodation of the data size, causing the transmitter terminal to transmit the data to the communication section of the receiver terminal; and
    if the storage section of the receiver terminal is short of free space for accommodation of the data size, causing a calculating section of the receiver terminal to calculate a waiting period required for recovery from the shortage of the free space in the storage section, causing the communication section of the receiver terminal to give information of a reception disabled state of the receiver terminal and the waiting period to the transmitter terminal, causing a timer section of the receiver terminal to time the lapse of the waiting period such that upon expiration of the waiting period, the receiver terminal calls the transmitter terminal to request re-transmission of the data, and causing the transmitter terminal to transmit the data to the communication section of the receiver terminal after the lapse of the waiting period.

13. A storage medium storing therein a computer-executable communication program for communications between a transmitter terminal and a receiver terminal via a communication line, the communication program performing the functions of:
    causing a communication section of the receiver terminal to request transmission of data and size information indicative of the size of the data from the transmitter terminal;
    causing a detection section of the receiver terminal to detect a free space in a storage section of the receiver terminal;
    causing a comparing section of the receiver terminal to compare the data size contained in the size information with the size of the free space in the storage section of the receiver terminal;
    if the storage section of the receiver terminal has a sufficient free space for accommodation of the data size, causing the transmitter terminal to transmit the data to the communication section of the receiver terminal; and
    if the storage section of the receiver terminal is short of free space for accommodation of the data size, causing a calculating section of the receiver terminal to calculate a waiting period required for recovery from the shortage of the free space in the storage section, causing the communication section of the receiver terminal to give information of a reception disabled state of the receiver terminal and the waiting period to the transmitter terminal, causing a timer section of the receiver terminal to time the lapse of the waiting period such that upon expiration of the waiting period, the receiver terminal calls the transmitter terminal to request re-transmission of the data, and causing the transmitter terminal to transmit the data to the communication section of the receiver terminal after the lapse of the waiting period.

\* \* \* \* \*